(12) United States Patent
Kwon (10) Patent No.: US 11,094,242 B2
(45) Date of Patent: Aug. 17, 2021

(54) MULTI-VISION SYSTEM

(71) Applicant: LG Display Co., Ltd., Seoul (KR)

(72) Inventor: Oh-Jong Kwon, Suwon-si (KR)

(73) Assignee: LG Display Co., Ltd., Seoul (KR)

(*) Notice: Subject to any disclaimer, the term of this patent is extended or adjusted under 35 U.S.C. 154(b) by 2 days.

(21) Appl. No.: 16/135,483

(22) Filed: Sep. 19, 2018

(65) Prior Publication Data

US 2019/0103048 A1    Apr. 4, 2019

(30) Foreign Application Priority Data

Sep. 29, 2017 (KR) .................. 10-2017-0128288

(51) Int. Cl.

| | | |
|---|---|---|
| G09G 3/20 | (2006.01) | |
| G09G 3/34 | (2006.01) | |
| G09G 5/18 | (2006.01) | |
| G09G 3/3208 | (2016.01) | |
| G09G 5/10 | (2006.01) | |
| G09G 3/3225 | (2016.01) | |
| G06F 3/14 | (2006.01) | |

(52) U.S. Cl.
CPC .......... *G09G 3/2022* (2013.01); *G06F 3/1423* (2013.01); *G09G 3/2092* (2013.01); *G09G 3/3208* (2013.01); *G09G 3/3225* (2013.01); *G09G 3/3406* (2013.01); *G09G 5/10* (2013.01); *G09G 5/18* (2013.01); *G09G 2320/064* (2013.01); *G09G 2320/066* (2013.01); *G09G 2320/0666* (2013.01); *G09G 2360/16* (2013.01)

(58) Field of Classification Search
CPC ...... G06F 3/1423; G06F 3/1446; G06F 3/147; G09G 3/2092; G09G 3/3208; G09G 5/10; G09G 3/2022; G09G 5/12; G09G 2360/16; G09G 2300/026; G09G 2320/0233

See application file for complete search history.

(56) References Cited

U.S. PATENT DOCUMENTS

| | | | | |
|---|---|---|---|---|
| 2005/0134525 A1* | 6/2005 | Tanghe | ................. | G06F 3/1446 345/1.1 |
| 2013/0314458 A1* | 11/2013 | Murai | ................. | G09G 3/3406 345/691 |
| 2014/0340437 A1* | 11/2014 | Kohashikawa | ....... | G06F 3/1446 345/694 |

(Continued)

FOREIGN PATENT DOCUMENTS

| | | |
|---|---|---|
| CN | 201397653 Y | 2/2010 |
| CN | 103354936 A | 10/2013 |

(Continued)

OTHER PUBLICATIONS

Office Action dated Apr. 23, 2021, issued in corresponding Chinese Patent Application No. 201811099251.4.

*Primary Examiner* — Dennis P Joseph
(74) *Attorney, Agent, or Firm* — Morgan, Lewis & Bockius LLP (57) ABSTRACT

A multi-vision system for preventing luminance deviation due to a driving time difference in a plurality of display modules is disclosed. The plurality of display modules adjust driving time of the respective display modules to be identical or similar via inter-module communication, determines target gain according to the adjusted driving time, and applies the determined target gain to correct luminance of received image.

16 Claims, 8 Drawing Sheets

(56) References Cited

U.S. PATENT DOCUMENTS

2016/0062725 A1* 3/2016 Odagiri ................ G06F 3/1446
                                                                345/1.3
2017/0032763 A1   2/2017 Cheong

FOREIGN PATENT DOCUMENTS

| CN | 103544919 A | 1/2014 |
| CN | 106409839 A | 2/2017 |
| JP | H03-171884 A | 7/1991 |
| JP | H08-317322 A | 11/1996 |
| JP | H10-124003 A | 5/1998 |
| JP | 2002-006804 A | 1/2002 |

* cited by examiner

PANEL MALFUNCTION AFTER 20,000H DRIVING

FIG. 5B

REPLACEMENT

FIG. 5C

ADJUST TIMER

FIG. 6A

- Timer: INITIAL TIMER VALUE
- Timer': TIMER VALUE AFTER ONE ROUND (FORWARD DIRECTION)

FIG. 6B

- Offset: 50
- Timer: INITIAL TIMER VALUE
- Timer': TIMER VALUE AFTER ONE-ROUND (FORWARD DIRECTION)
- Timer'': TIMER VALUE AFTER TWO-ROUND (REVERSE DIRECTION)

MULTI-VISION SYSTEM

This application claims the benefit of Korean Patent Application No. 10-2017-0128288, filed on Sep. 29, 2017, which is hereby incorporated by reference as if fully set forth herein.

BACKGROUND

Technical Field

The present disclosure relates to a multi-vision system for preventing luminance deviation due to a driving time difference in a plurality of display modules.

Description of the Related Art

Representative examples of a display device for displaying an image using digital image data include a liquid crystal display (LCD) using liquid crystal, an organic light emitting diode (OLED) display using an OLED, and an electrophoretic display (EPD) using electrophoretic particles.

Thereamong, the OLED display uses a self-emissive device for emitting light from an organic light emitting layer via recombination between electrons and holes and, thus, it is advantageous that the OLED display has high brightness and a low driving voltage, and is super thinned and, has a flexible shape.

Recently, OLED displays have been applied to a multi-vision configured to connect a plurality of independently driven display modules to each other to display a single image or partially different images through the plurality of display modules.

An OLED display is reduced in lifetime because an OLED device is degraded due to an increase in current stress when being driven for a long time and, thus, a method of gradually reducing entire luminance according to driving time as driving time is increased has been used.

However, when a plurality of OLED display modules included in a multi-vision are driven for a long time and, then, any one display module malfunctions and is replaced, a newly installed display module and an existing display module driven for a long time have different overall luminance levels adjusted according to driving time and, thus, there is a problem in terms of luminance deviation between the new display module and the existing display module.

SUMMARY

Accordingly, embodiments of the present disclosure are directed to a multi-vision system that substantially obviates one or more of the problems due to limitations and disadvantages of the related art.

An object of the present disclosure is to provide a multi-vision system for preventing luminance deviation due to a driving time difference in a plurality of display modules.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a multi-vision system comprises a plurality of display modules configured to receive an input image segmented and supplied from a host system and to display the input image on a corresponding display panel using an OLED panel. The plurality of display modules may adjust driving times of the respective display modules to be identical or similar via inter-module communication, determine a target gain according to the adjusted driving time, and apply the determined target gain to correct luminance of the input image.

The plurality of display modules may adjust driving time of each of the display modules as a maximum of driving times of the display modules via inter-module communication or apply offset time to the maximum of the driving times of the display modules to be similar.

A timing controller included in each of the plurality of display modules may analyze the input image on a frame basis to calculate an average picture level (APL), determine a maximum value of APLs of the respective plurality of display modules as a common APL via inter-module communication, and primarily correct luminance of the input image according to the determined common APL.

The timing controller included in each of the plurality of display modules may calculate a total current value on a frame basis from the image with the primarily corrected luminance, calculate an automatic current limit (ACL) value in such a way that the calculated total current value is equal to or less than a predetermined current maximum value, determine a minimum value of ACLs of the respective plurality of display modules as a common ACL value via inter-module communication, and secondarily correct the image with the primarily corrected luminance according to the determined common ACL value.

The timing controller included in each of the plurality of display modules may apply the target gain determined according to the adjusted driving time to the image with the primarily corrected luminance or the image with the secondarily corrected luminance to additionally correct luminance of the image with the primarily corrected luminance or the image with the secondarily corrected luminance.

The timing controller included in each of the plurality of display modules may calculate a total current value on a frame basis from the image with the primarily corrected luminance, calculate an ACL value in such a way that the calculated total current value is equal to or less than a predetermined maximum current value, apply the determined target gain to the adjusted driving time to adjust the calculated ACL value, determine a minimum value of the adjusted ACL values of the respective plurality of display modules as a common ACL value via inter-module communication, and secondarily correct the image with the primarily corrected luminance according to the determined common ACL value.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Reference will be made to embodiments of the present disclosure, examples of which are illustrated in the accompanying drawings.

Figure 1:
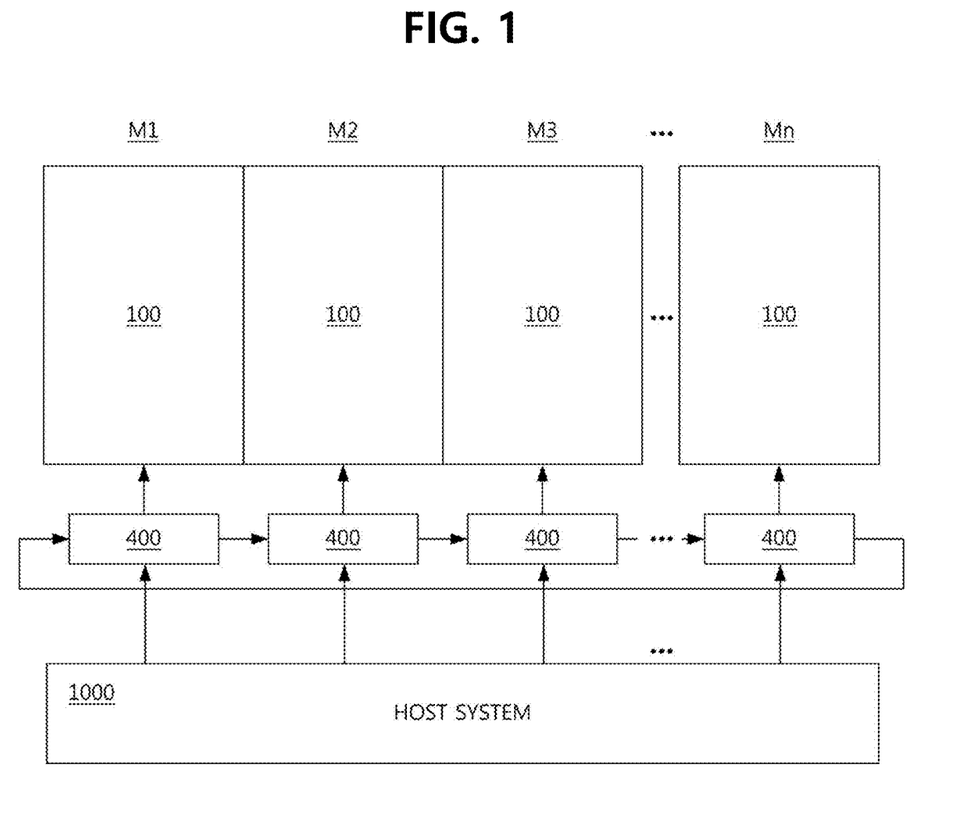
FIG. 1 is a schematic block diagram of a multi-vision system according to an embodiment.

FIG. 1 is a schematic block diagram of a multi-vision system according to an embodiment.

The multi-vision system illustrated in FIG. 1 may include a host system 1000 and a plurality of display modules M1 to Mn (n being a natural number equal to or greater than 2) that are separately connected to the host system 1000.

The host system 1000 may receive an image source and distribute and supply the image source to the plurality of display modules M1 to Mn. The host system 1000 may scale images to be displayed on the plurality of display modules M1 to Mn according to resolution of the respective display modules and, then, supply the scaled images along with base timing control signals to the respective display modules. The host system 1000 may supply the images along with information on unique identifications (IDs) applied to the respective plurality of display modules M1 to Mn to the respective display modules.

The plurality of display modules M1 to Mn may perform image-processing on segmented images that are separately transmitted from the host system 1000 and display the images on the respective organic light emitting diode (OLED) panels 100. The plurality of display modules M1 to Mn may be arranged in a line as shown in FIG. 1, arranged in a matrix, or arranged in various forms to configure one large screen.

The plurality of display modules M1 to Mn may independently receive corresponding images from the host system 1000 and, thus, as necessary, may be grouped into a plurality of groups to configure different screens for the respective groups or to configure separate screens.

The plurality of display modules M1 to Mn may share image information and driving time information or image information to which driving time is applied via inter-module communication and adjust image luminance of each module using a common value to alleviate luminance deviation between modules due to a difference in an input image and driving time and to regularize luminance of images that are segmentally displayed on the plurality of display modules M1 to Mn.

Figure 2:
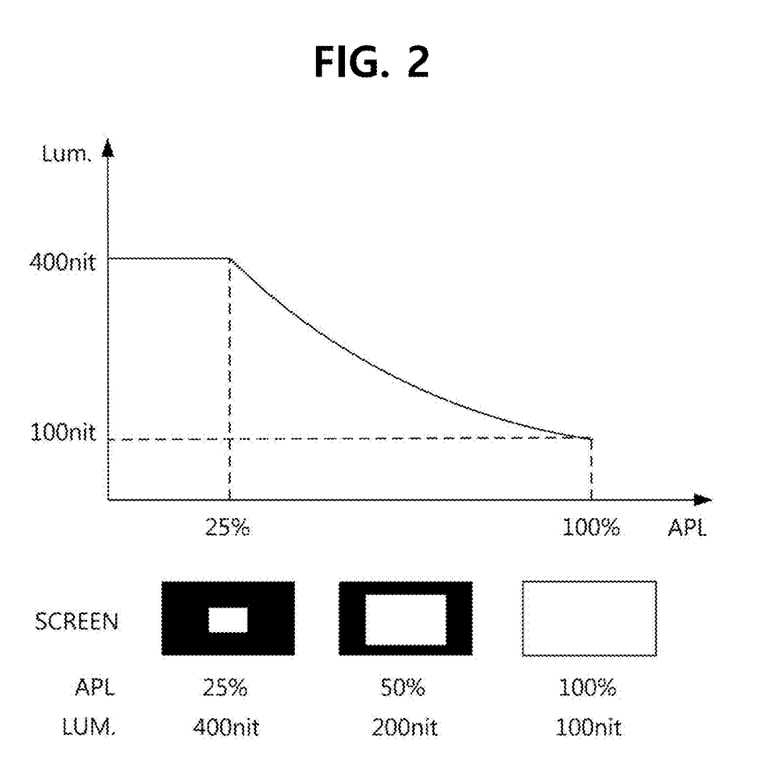
FIG. 2 is a graph showing a luminance adjustment relationship according to an average picture level (APL) of an input image in each display module according to an embodiment.

To enhance a contrast ratio and to reduce power consumption, each of the plurality of display modules M1 to Mn may calculate an average picture level (APL) of input images and adjust image luminance based on the calculated APL. In this case, to alleviate luminance deviation between modules due to difference in APL values according to images of the plurality of display modules M1 to Mn, each of the plurality of display modules M1 to Mn may share the APLs via inter-module communication to determine a common APL and adjust image luminance according to the determined common APL. Referring to FIG. 2, each display module may perform luminance correction of increasing image luminance as an APL is lowered and reducing image luminance as an APL is increased. Accordingly, each of the plurality of display modules M1 to Mn may determine a minimum value of a plurality of APLs as the common APL via inter-module communication and adjust the image luminance according to the common APL.

Each of the plurality of display modules M1 to Mn may calculate total current of an image, luminance of which is adjusted according to the common APL, and may further perform automatic current limit (ACL) image processing for lowering peak brightness and limiting maximum current consumption when the total current is greater than a predetermined maximum current value. In this case, to alleviate luminance deviation between modules due to a difference in ACL values according to an image of each of the plurality of display modules M1 to Mn, each of the plurality of display modules M1 to Mn may share the ACL values or target luminance corresponding to an ACL value to determine a common ACL value via inter-module communication and may further adjust image luminance according to the determined common ACL value.

Figure 3A:
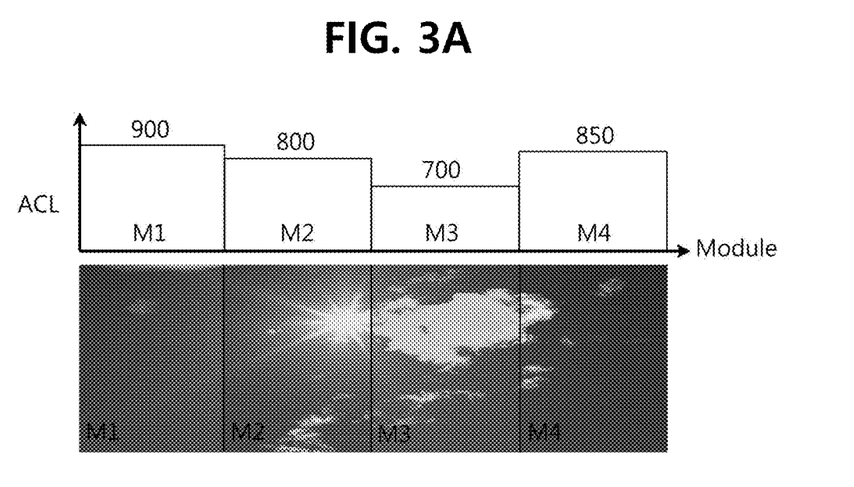
FIG. 3A and FIG. 3B are diagrams showing an example of a method of matching automatic current limit (ACL) values in a plurality of display modules according to an embodiment.
Figure 3B:
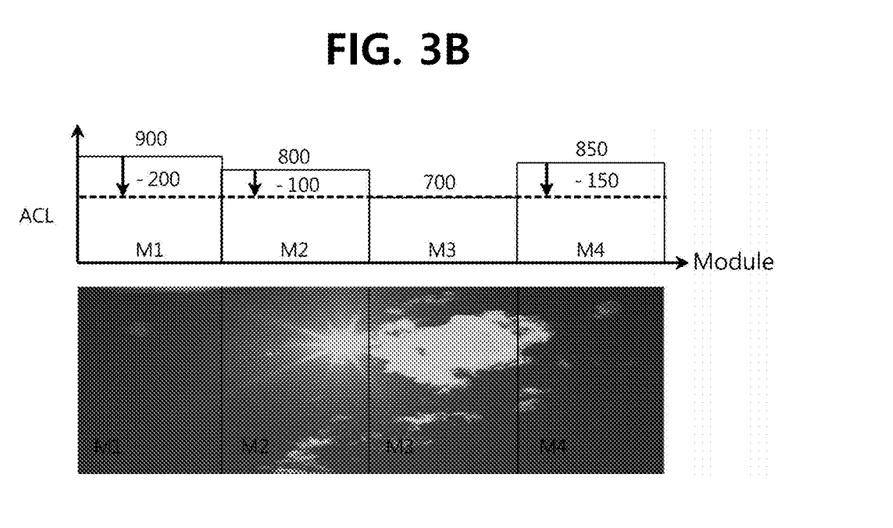

As shown in FIG. 3A, a plurality of display modules M1 to M4 have different ACL values 900, 800, 700, and 850 according to images, causing luminance deviation. Thus, the plurality of display modules M1 to M4 may determine a minimum value 700 among the plurality of ACL values 900, 800, 700, and 850 as the common ACL value 700 via inter-module communication, as shown in FIG. 3B. Each of the plurality of display modules M1 to Mn may adjust image luminance using the common ACL value 700 as target peak luminance to ensure luminance uniformity of images that are segmentally displayed on the plurality of display modules M1 to Mn, as shown in FIG. 3B.

Figure 4:
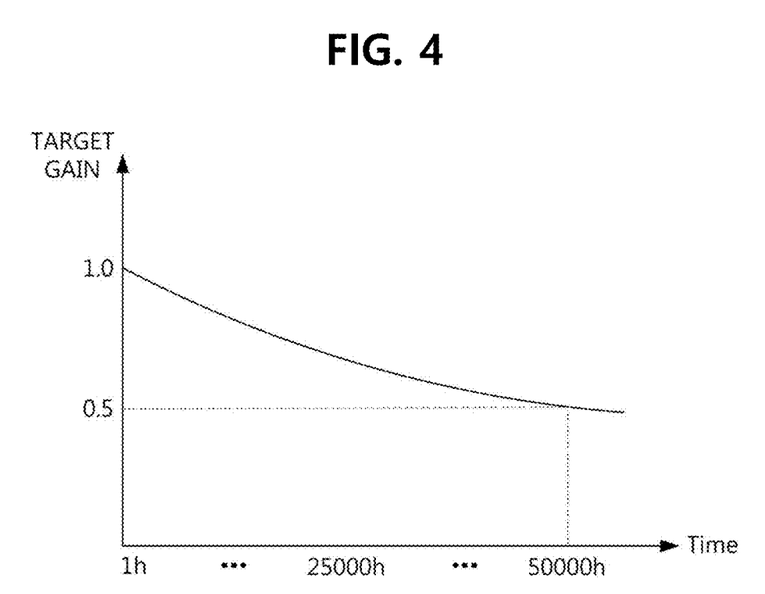
FIG. 4 is a graph showing a variation relationship of a target gain according to driving time in each display module according to an embodiment.

To alleviate degradation of an OLED device as driving time of the panel 100 elapses, each of the plurality of display modules M1 to Mn may apply a target gain that is gradually reduced to further adjust image luminance as driving time elapses, as shown in FIG. 4. In other words, each of the plurality of display modules M1 to Mn may apply the target gain that is reduced as driving time elapses to reduce image luminance, thereby alleviating degradation of the OLED device.

Figure 5A:
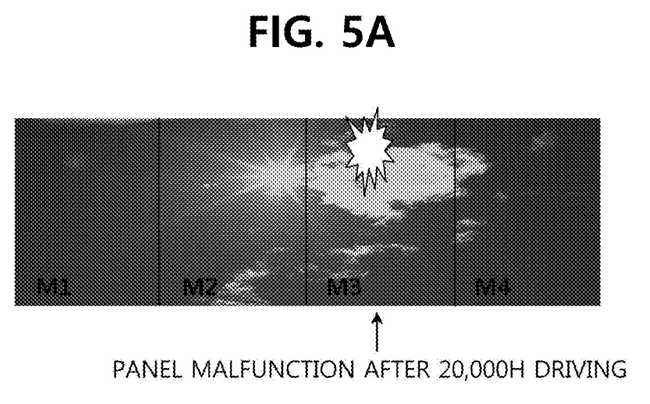
FIG. 5A, FIG. 5B, and FIG. 5C are diagrams showing an example of a luminance variation before and after driving time between modules is matched when a module is replaced in a multi-vision system according to an embodiment.
Figure 5B:
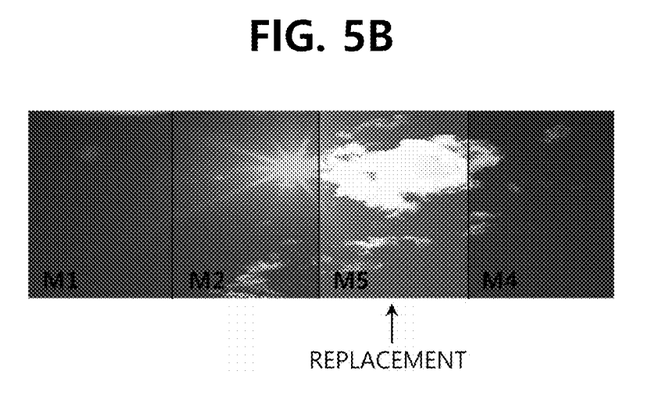

In the multi-vision system, as shown in FIG. 5A, when the plurality of display modules M1 to M4 are driven for a long time and then at least one of module M3 malfunctions and is replaced, the replaced display module M5 and the existing display modules M1, M2, and M4 driven for a long time may have different driving times. Thus, target gains applied to images may be different and luminance deviation may occur due to a driving time difference between the replaced module M5 and the existing display modules M1, M2, and M4, as shown in FIG. 5B.

Figure 5C:
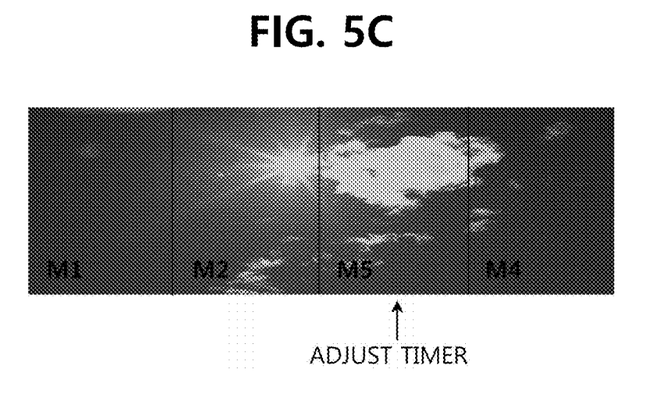

To prevent this, when at least one of the plurality of display modules M1 to Mn according to an embodiment is replaced, maximum driving time among the plurality of driving time periods may be shared via inter-module communication. The plurality of display modules M1 to Mn may apply the same or similar target gain according to the shared maximum driving time to adjust luminance of each image. Thus, alleviate luminance deviation between the replaced module M5 and the existing display modules M1, M2, and M4 to regularize luminance of images that are segmentally displayed on the plurality of display modules M1 to Mn, as shown in FIG. 5C.

As such, in the multi-vision system according to an embodiment of the present invention, even if at least one of a plurality of display modules is replaced, maximum driving time may be shared via inter-module communication to uniformly or similarly apply target luminance according to driving time, preventing or minimizing luminance deviation due to a driving time difference between modules.

Figure 6A:
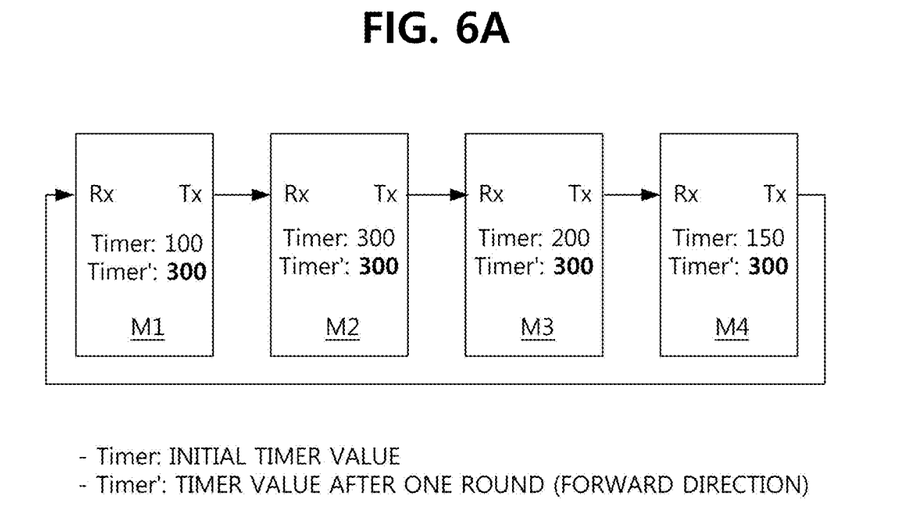
FIG. 6A and FIG. 6B show a method of matching driving time information via inter-module communication in a plurality of display modules according to an embodiment.
Figure 6B:
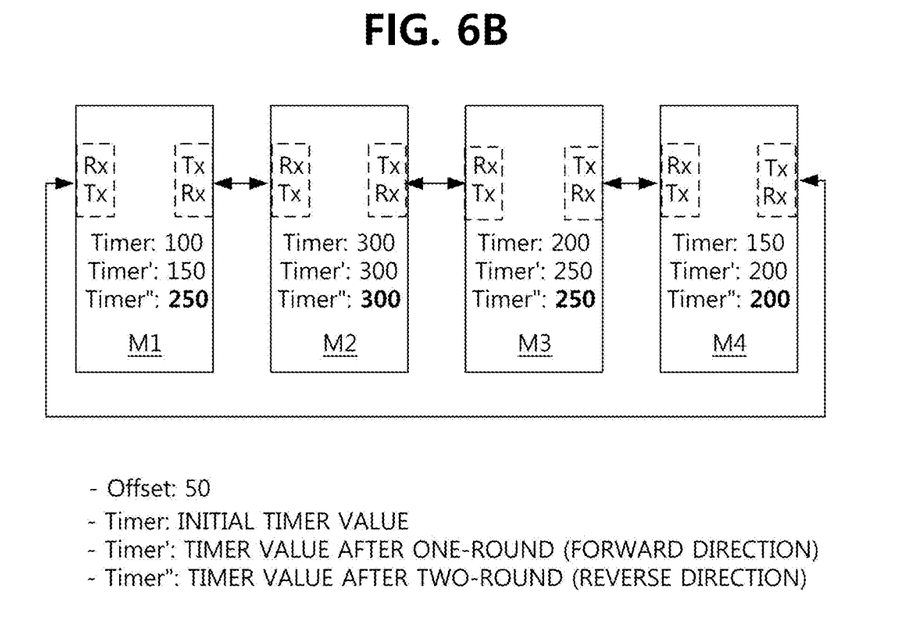

FIG. 6A and FIG. 6B show a method of matching driving time information via inter-module communication in a plurality of display modules according to an embodiment and exemplifies four display modules M1 to M4.

Referring to FIG. 6A and FIG. 6B, the plurality of display modules M1 to M4 may be connected to each other in a daisy chain connection structure through a communication unit including a transmitter Tx and a receiver Rx, included in each of the display modules M1 to M4, and may share driving time information (timer values) indicated by each timer via inter-module communication to adjust the time values to the same value or to adjust the time values to similar values and, thus, luminance deviation is not recognized.

Referring to FIG. 6A, the first module M1 may transmit a timer value Timer: 100 thereof to the second module M2. The second module M2 may adjust a timer value thereof to a largest value 300 among the timer value 100 received from the first module M1 and a timer value Timer: 300 of the second module M2 and transmit the adjusted timer value Timer': 300 to the third module M3. The third module M3 may adjust a timer value thereof to a largest value 300 among the timer value 300 received from the second module M2 and a timer value Timer: 200 of the third module M3 and transmit the adjusted timer value Timer': 300 to the fourth module M4. The fourth module M4 may adjust a timer value thereof to a largest value 300 among the timer value 300 received from the third module M3 and a timer value Timer: 150 of the fourth module M4 and transmit the adjusted timer value Timer': 300 to the first module M1. The first module M1 may adjust a timer value thereof to a largest value 300 among the timer value 300 received from the fourth module M4 and the timer value Timer: 100 of the first module M1 and terminate communication. Accordingly, the plurality of display modules M1 to M4 may adjust different timer values to the same value, i.e., a maximum value 300 and apply the same target gain to images, thereby preventing luminance deviation of images that are segmentally displayed on the plurality of display modules M1 to M4.

In FIG. 6A, Timer refers to an initial timer value of each display module and Timer' refers to a timer value that is adjusted by each display module via one-round forward-direction communication with respect to the plurality of display modules M1 to M4.

As shown in FIG. 6A, when timer values of the plurality of display modules M1 to M4 are adjusted to the same value, i.e., a maximum value, image luminance may be reduced and, thus, as the number of replaced modules is increased, entire luminance of the plurality of display modules M1 to M4 may be lowered.

Accordingly, as shown in FIG. 6B, a timer value with which luminance deviation is not visibly recognized may be set to an offset time 50 and, when a maximum value is applied to a timer value via inter-module communication of the plurality of display modules M1 to M4, the set offset time may be subtracted and the maximum value may be applied. For example, when an offset value between neighboring modules is set to 50, a difference of a timer value in neighboring modules may be set to a maximum of 50 after two-round communication, as shown in FIG. 6B. Accordingly, timer values shared by the plurality of display modules M1 to M4 may be reduced compared with the case in which the timer values are adjusted to the same value, i.e., a maximum value, thereby enhancing luminance.

In FIG. 6B, Timer refers to an initial timer value of each display module, Timer' refers to a timer value that is adjusted by each display module via one-round forward-direction communication with respect to the plurality of display modules M1 to M4, and Timer" refers to a timer value that is adjusted by each display module via one-round forward-direction communication and two-round reverse-direction communication with respect to the plurality of display modules M1 to M4.

As shown in FIG. 6B, when the plurality of display modules M1 to M4 perform one-round communication only in a forward direction to apply offset time to timer values to be adjusted to a similar value Timer', a difference in Timer' between the first and second modules M1 and M2 may be greater than the offset time 50. To alleviate the timer difference between modules, the plurality of display modules M1 to M4 may adjust timer values between modules to Timer" via bi-directional communication including one-round forward-direction communication and two-round reverse-direction communication. Accordingly, when timer values of the plurality of display modules M1 to M4 are adjusted via bi-directional communication, the offset time 50 may be reduced compared with the case in which a timer difference between adjacent modules is adjusted via one-direction communication and, thus, the timer values may be reduced in such a way that luminance deviation between neighboring modules is not recognized.

Figure 7:
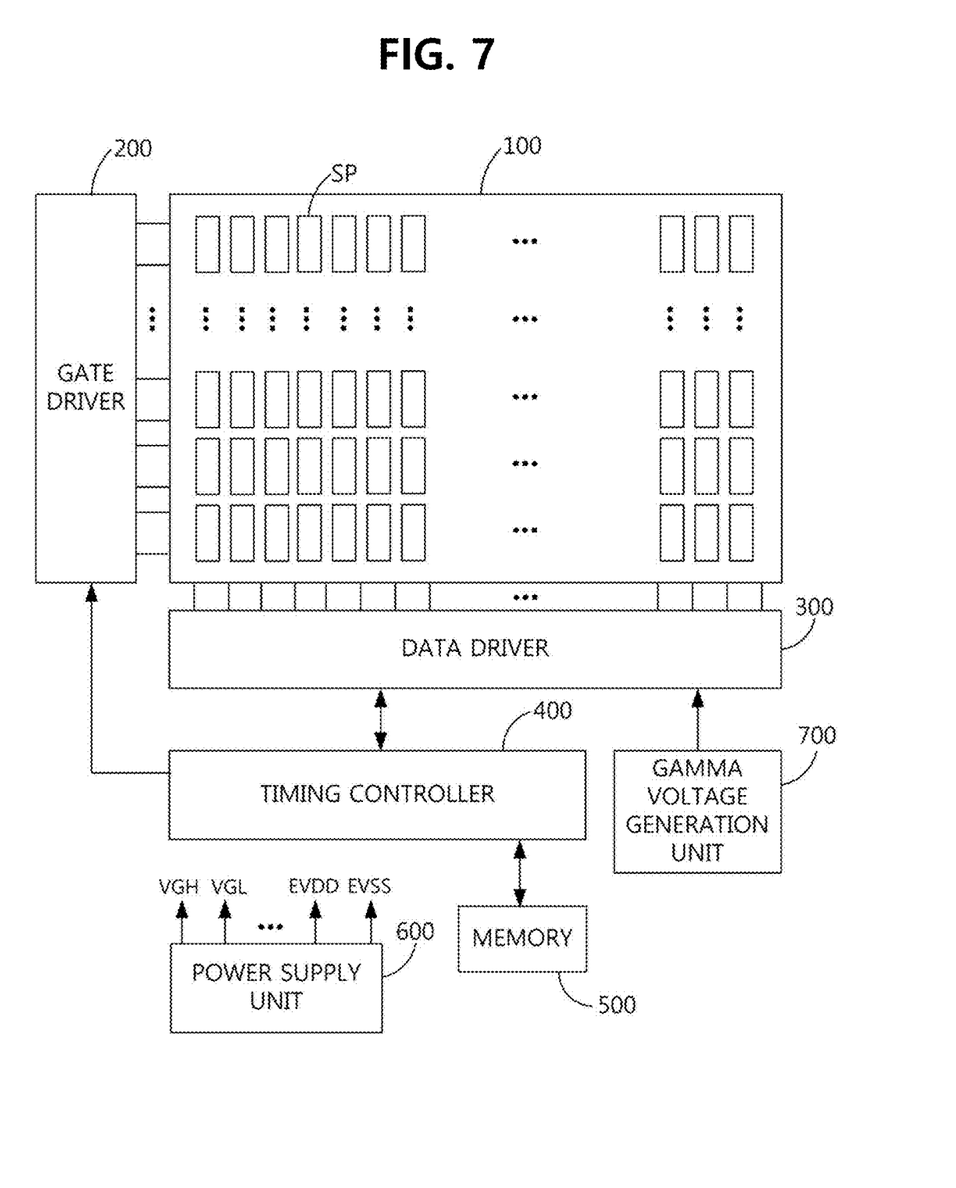
FIG. 7 is a schematic block diagram showing components of each display module according to an embodiment.
Figure 8:
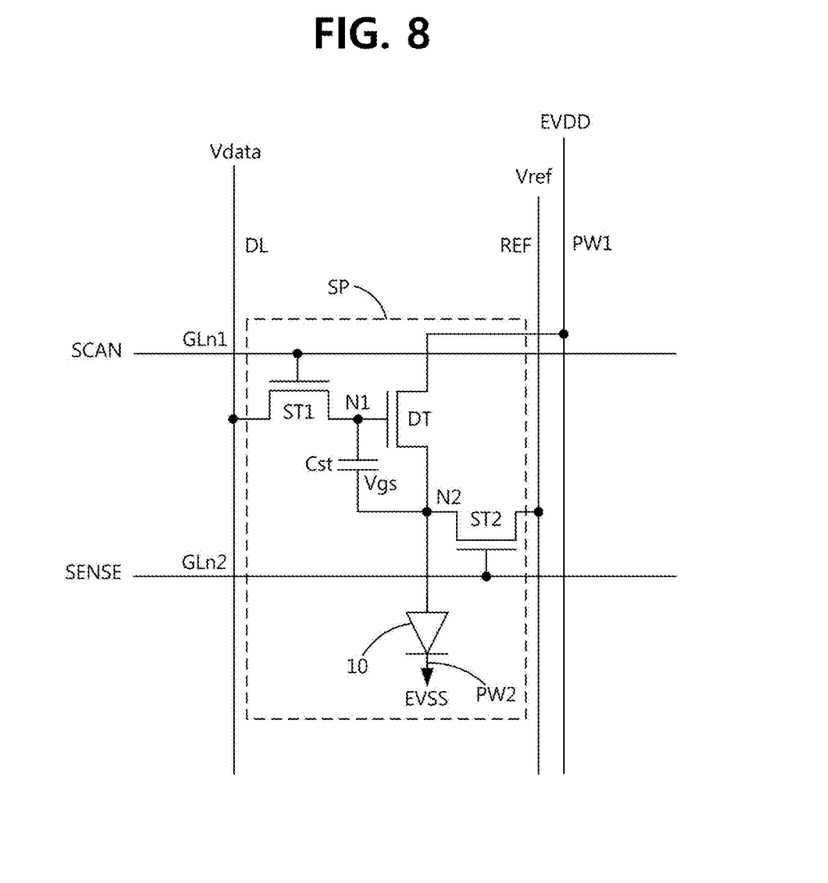
FIG. 8 is an equivalent circuit diagram showing an example of components of each subpixel according to an embodiment.

FIG. 7 is a schematic block diagram showing components of each display module according to an embodiment. FIG. 8 is an equivalent circuit diagram showing an example of components of each subpixel shown in FIG. 7.

Each display module shown in FIG. 7 may include a panel 100, a gate driver 200, a data driver 300, a timing controller 400, a memory 500, a gamma voltage generation unit 700, a power supply unit 600, and so on.

The power supply unit 600 may generate and output various driving voltages required to drive all circuit components of the display module, i.e., the panel 100, the gate driver 200, the data driver 300, the timing controller 400, the gamma voltage generation unit 700, the memory 500, and so on using an input voltage received from the outside. For example, the power supply unit 600 may generate a digital driving voltage supplied to the timing controller 400, the data driver 300, and so on, an analog driving voltage supplied to the data driver 300, a gate on voltage VGH and gate off voltage VGL supplied to the gate driver 200, a plurality of driving voltages EVDD and EVSS required to drive the panel 100, and a reference voltage using the input voltage and supply the generated voltages to the panel 100 through the data driver 300.

The panel 100 may display an image through a pixel array in which subpixels SPs are arranged in a matrix. A basic pixel may include at least three subpixels capable of realizing white by color mixture among white W, red R, green G, and blue B subpixels. For example, the basic pixel may include subpixels of R/G/B combination, subpixels of W/R/G combination, subpixels of B/W/R combination, and subpixels of G/B/W combination or may include subpixels of W/R/G/B combination.

Referring to FIG. 8, each subpixel SP may include a pixel circuit that at least includes an OLED device 10 connected between a high-potential driving voltage (a first driving voltage, hereinafter, EVDD) line PW1 and alow-potential driving voltage (a second driving voltage, hereinafter, EVSS) line PW2, and first and second switching TFTs ST1 and ST2, a driving TFT DT, and a storage capacitor Cst, for independently driving the OLED element 10. The pixel circuit may have various configurations other than the configuration shown in FIG. 8 and, thus, may be configured in various ways.

The switching TFTST1 and ST2 and the driving TFT DT may use an amorphous silicon (a-Si) TFT, a poly-silicon (poly-Si) TFT, an oxide TFT, an organic TFT, or the like.

The OLED element 10 may include an anode connected to a source node N2 of a driving TFTDT, a cathode connected to the EVSS line PW2, and an organic emissive layer between the anode and the cathode. The anode may be independently configured for respective subpixels and the cathode may be a common electrode shared by all subpixels. In the OLED element 10, when driving current from the driving TFT DT is supplied thereto, electrons from the cathode are injected into an organic emissive layer, holes from the anode are injected into the organic emissive layer, and the organic emissive layer emits light from a fluorescent or phosphor material via recombination between electrons and holes to generate light with intensity that is proportional to a current value of driving current.

The first switching TFTST1 may be driven by a scan pulse SCAN supplied to one gate line GLn1 from the gate driver 200 and may supply a data voltage Vdata supplied to the data line DL from the data driver 300 to a gate node N1 of the driving TFTDT.

The second switching TFT ST2 may be driven by a sense pulse SENSE supplied to another gate line GLn2 from the gate driver 200 and may supply a reference voltage Vref supplied to the reference line REF from the data driver 300 to the source node N2 of the driving TFT DT.

The storage capacitor Cst connected between the gate node N1 and the source node N2 of the driving TFT DT may charge a difference voltage between the data voltage Vdata and the reference voltage Vref that are supplied to the gate node N1 and the source node N2 through the first and second switching TFTs ST1 and ST2, respectively, with a driving voltage Vgs of the driving TFT DT and hold the driving voltage Vgs that is charged during a light emitting time period in which the first and second switching TFTs ST1 and ST2 are turned off.

The driving TFT DT may control current supplied from the EVDD line PW1 according to the driving voltage Vgs supplied from the storage capacitor Cst and supply driving current determined by the driving voltage Vgs to the OLED element 10 to allow the OLED element 10 to emit light.

In the case of a sensing mode of a subpixel SP, the driving TFT DT may receive the data voltage Vdata for sensing, supplied through the data line DL and the first switching TFT ST1, and the reference voltage Vref supplied through the reference line REF and the second switching TFT ST2 and may be driven by the received voltages. Pixel current to which electrical characteristics (Vth and mobility) of the driving TFT DT are applied may be charged as a voltage in a line capacitor of the reference line REF in a floating state through the second switching TFT ST2. The data driver 300 may sample a voltage charged in the reference line REF, convert the voltage into sensing data of each subpixel SP, and output the sensing data to the timing controller 400.

The gate driver 200 may separately drive gate lines of the panel 100 using a plurality of gate control signals supplied from the timing controller 400. The gate driver 200 may supply a gate on voltage VGH to a corresponding gate line during a driving time period of the corresponding gate line and supply a gate off voltage VGL to a corresponding gate line during a non-driving time period of the corresponding gate line. The gate driver 200 may supply a scan pulse SCAN to a gate line for scan and supply a sense pulse SENSE to the gate line for sensing.

The gate driver 200 may include a plurality of gate integrated circuits (ICs) and may be separately installed in a circuit film such as a chip on film (COF) to be bonded to the panel 100 using a tape automated bonding (TAB) method or may be installed on the panel 100 using a chip on glass (COG) method. The gate driver 200 may be configured as a gate in panel (GIP) in which the gate driver is formed on a thin film transistor substrate along with a thin film transistor array included in a pixel array of the panel 100 and built in a non-active area of the panel 100.

The gamma voltage generation unit 700 may generate a reference gamma voltage set including a plurality of reference gamma voltages with different voltage levels and supply the reference gamma voltage set to the data driver 300.

The data driver 300 may convert image data supplied from the timing controller 400 into an analog data signal according to a data control signal supplied from the timing controller 400 and supply the analog data signal to data lines of the panel 100. The data driver 300 may subdivide the reference gamma voltages supplied from the gamma voltage generation unit 700 into a plurality of gray scale voltages corresponding to gray scale values of the data. The data driver 300 may convert digital data into an analog data voltage using the subdivided gray scale values and supply the data voltage to each of the data lines DLs of the panel 100. The data driver 300 may supply the reference voltage Vref supplied from the power supply unit 600 to reference lines of the panel 100 according to control of the timing controller 400.

In the case of a sensing mode according to control of the timing controller 400, the data driver 300 may supply a data voltage for sensing to a data line to drive each subpixel, sense pixel current indicating the electrical characteristics of the driven subpixel as a voltage through a reference line, convert the sensed voltage into digital sensing data, and provide the digital sensing data to the timing controller 400.

The data driver 300 may include a plurality of data ICs and may be installed in a circuit film such as a chip on film (COF) to be bonded to the panel 100 using a tape automated bonding (TAB) method or may be installed on the panel 100 using a chip on glass (COG) method.

The timing controller 400 may receive image data and input timing control signals from the host system 1000 (refer to FIG. 1). The input timing control signals may include a dot clock, a data enable signal, a vertical synchronization signal, a horizontal synchronization signal, and so on.

The timing controller 400 may generate a plurality of data control signals for control of driving timing of the data driver 300 using input timing control signals supplied from the host system 1000 and timing setting information (start timing, pulse width, etc.) stored in an internal register to supply the data control signals to the data driver 300, and generate a plurality of gate control signals for control of a driving time of the gate driver 200 to supply the gate control signals to the gate driver 200.

In the case of a sensing mode, the timing controller 400 may sense electrical characteristics (Vth of a driving TFT, mobility, Vth of an OLED, etc.) of each subpixel of the panel 100 through the data driver 300 and update a compensation value of each subpixel, stored in the memory 500, using the sensing result.

The timing controller 400 may reduce power consumption with respect to an input image supplied from the host system 1000 and perform luminance correction processing for reducing degradation of the OLED device 10. In particular, the timing controller 400 may share image information and driving time information via inter-module communication using a built-in communication unit with another module to determine a common value and perform luminance correction processing on an input image according to the determined common value.

The timing controller 400 may analyze an input image on a frame basis to calculate an average picture level (APL) and determine a maximum value of APLs of a plurality of modules as a common ALP via inter-module communication. The timing controller 400 may determine first target peak luminance and a first luminance gain based thereon, which are inversely proportional to each other, according to the common APL and apply the determined first luminance gain to primarily correct luminance of the input image.

The timing controller 400 may calculate total current on a frame basis using the primarily corrected image data according to the common APL, determine an ACL value for limiting current when the calculated total current is greater than a current limit, and determine a minimum value of ACL values of a plurality of modules via inter-module communication as a common ACL value. The timing controller 400 may determine a second luminance gain according to the common ACL value and apply the second luminance gain to secondarily correct image luminance.

The timing controller 400 may share a maximum driving time among driving time (timer values) via inter-module communication, determine a target gain according to the shared maximum driving time, and apply the determined target gain to thirdly correct the image luminance.

The timing controller 400 may determine an ACL value using the primarily corrected image data according to the common APL, apply target luminance according to driving time to adjust the ACL value, determine a minimum value among a plurality of ACL values as a common ACL value through inter-module communication, and, then, secondarily correct image luminance according to the determined common ACL value.

In addition, the timing controller 400 may linearize image data via de-gamma conversion processing to perform the aforementioned luminance correction processing and perform gamma conversion processing after the luminance correction processing to linearize and output image data with the corrected luminance.

The timing controller 400 may convert gamma-converted image data into voltage data, apply a compensation value of characteristic deviation of each subpixel, stored in the memory 500, to the voltage data to perform external compensation processing, and supply the external compensated data to the data driver 300.

As such, a plurality of display modules of a multi-vision system according to an embodiment may share image information and driving time information or image information to which the driving time is applied via inter-module communication to adjust image luminance of each module using a common value and, thus, alleviate luminance deviation between modules due to a difference in image information and driving image to regularize luminance of images that are segmentally displayed on a plurality of display modules.

Accordingly, in a multi-vision system according to an embodiment, even if at least one module of a plurality of display modules is replaced, driving time information or image information to which the driving time is applied may be shared via inter-module communication to apply a target gain or target peak luminance within the same or similar range to each image to prevent luminance deviation due to a driving time difference between modules.

It will be apparent to those skilled in the art that various modifications and variations can be made in the disclosure without departing from the spirit or scope of the invention. Thus, it is intended that the disclosure covers the modifications and variations of this disclosure provided they come within the scope of the appended claims and their equivalents.

It will be apparent to those skilled in the art that various modifications and variations can be made in the multi-vision system of the present disclosure without departing from the technical idea or scope of the disclosure. Thus, it is intended that the present disclosure cover the modifications and variations of this disclosure provided they come within the scope of the appended claims and their equivalents.

What is claimed is:

1. A multi-vision system, comprising:
a plurality of display modules each including a display panel and a power supply, the plurality of display modules configured to receive an input image segmented and supplied from a host system and to display the input image on a corresponding display panel,
wherein each of the plurality of display modules:
compares driving time of the respective display module with a driving time shared by the other plurality of display modules via inter-module communication, adjusts the driving time of the respective display module to be identical or similar to the larger of the driving times from the comparison, and shares the adjusted driving time with the other plurality of display modules via the inter-module communication, whereby all of the plurality of display modules have a same or similar adjusted driving time corresponding to a maximum of the driving times shared by the plurality of display modules via the inter-module communication,
determines a target gain according to the adjusted driving time, and
applies the determined target gain to correct luminance of the received image,
wherein the driving time of each display module is a timer value representing a total time that the respective display module has been driven,
wherein the total time that the respective display module has been driven corresponds to a time that the respective power supply provides the respective display panel with a driving voltage.

2. The multi-vision system of claim 1, wherein a timing controller included in each of the plurality of display modules analyzes the input image on a frame basis to calculate an average image level (APL), determines a maximum value of APLs of the respective plurality of display modules as a common APL via inter-module communication, and primarily corrects luminance of the input image according to the determined common APL.

3. The multi-vision system of claim 2, wherein the timing controller included in each of the plurality of display modules applies the target gain determined according to the adjusted driving time to the image with the primarily corrected luminance to additionally correct luminance of the image with the primarily corrected luminance.

4. The multi-vision system of claim 2, wherein the timing controller included in each of the plurality of display modules calculates a total current value on a frame basis from the image with the primarily corrected luminance, calculates an automatic current limit (ACL) value in such a way that the calculated total current value is equal to or less than a predetermined current maximum value, determines a minimum value of ACLs of the respective plurality of display modules as a common ACL value via inter-module communication, and secondarily corrects the image with the primarily corrected luminance according to the determined common ACL value.

5. The multi-vision system of claim 4, wherein the timing controller included in each of the plurality of display modules applies the target gain determined according to the adjusted driving time to the image with the secondarily corrected luminance to additionally correct luminance of the image with the secondarily corrected luminance.

6. The multi-vision system of claim 2, wherein the timing controller included in each of the plurality of display modules calculates a total current value on a frame basis from the image with the primarily corrected luminance, calculates an ACL value in such a way that the calculated total current value is equal to or less than a predetermined maximum current value, applies the determined target gain to the adjusted driving time to adjust the calculated ACL value, determines a minimum value of the adjusted ACL values of the respective plurality of display modules as a common ACL value via inter-module communication, and secondarily corrects the image with the primarily corrected luminance according to the determined common ACL value.

7. The multi-vision system of claim 1, wherein each of a plurality of display modules use an organic light emitting diode display panel.

8. The multi-vision system of claim 1, wherein the respective display modules are connected to each other in a daisy chain connection structure to communicate with each other through the inter-module communication.

9. A method of driving a multi-vision system, comprising:
receiving, for a plurality of display modules each including a display panel and a power supply, an input image segmented and supplied from a host system and displaying the input image on a corresponding display panel,
comparing, for each of the plurality of display modules, driving time of the respective display module with a driving time shared by the other plurality of display modules via inter-module communication, adjusting the driving time of the respective display module to be identical or similar to the larger of the driving times from the comparison, and sharing the adjusted driving time with the other plurality of display modules via the inter-module communication, whereby all of the plurality of display modules have a same or similar adjusted driving time corresponding to a maximum of the driving times shared by the plurality of display modules via the inter-module communication, wherein the driving time of each display module is a timer value representing a total time that the respective display module has been driven,
wherein the total time that the respective display module has been driven corresponds to a time that the respective power supply provides the respective display panel with a driving voltage,
determining, for each of the plurality of display modules, a target gain according to the adjusted driving time, and
applying, for each of the plurality of display modules, the determined target gain to correct luminance of the received image.

10. The method of claim 9, wherein a timing controller included in each of the plurality of display modules analyzes the input image on a frame basis to calculate an average image level (APL), determines a maximum value of APLs of the respective plurality of display modules as a common APL via inter-module communication, and primarily corrects luminance of the input image according to the determined common APL.

11. The method of claim 10, wherein the timing controller included in each of the plurality of display modules applies the target gain determined according to the adjusted driving time to the image with the primarily corrected luminance to additionally correct luminance of the image with the primarily corrected luminance.

12. The method of claim 10, wherein the timing controller included in each of the plurality of display modules calculates a total current value on a frame basis from the image with the primarily corrected luminance, calculates an automatic current limit (ACL) value in such a way that the calculated total current value is equal to or less than a predetermined current maximum value, determines a minimum value of ACLs of the respective plurality of display modules as a common ACL value via inter-module communication, and secondarily corrects the image with the primarily corrected luminance according to the determined common ACL value.

13. The method of claim 12, wherein the timing controller included in each of the plurality of display modules applies the target gain determined according to the adjusted driving time to the image with the secondarily corrected luminance to additionally correct luminance of the image with the secondarily corrected luminance.

14. The method of claim 10, wherein the timing controller included in each of the plurality of display modules calculates a total current value on a frame basis from the image with the primarily corrected luminance, calculates an ACL value in such a way that the calculated total current value is equal to or less than a predetermined maximum current value, applies the determined target gain to the adjusted driving time to adjust the calculated ACL value, determines a minimum value of the adjusted ACL values of the respective plurality of display modules as a common ACL value via inter-module communication, and secondarily corrects the image with the primarily corrected luminance according to the determined common ACL value.

15. The method of claim 9, wherein each of a plurality of display modules use an organic light emitting diode display panel.

16. The method of claim 9, wherein the respective display modules are connected to each other in a daisy chain connection structure to communicate with each other through the inter-module communication.

* * * * *